United States Patent [19]

Cook et al.

[11] Patent Number: 5,022,970

[45] Date of Patent: Jun. 11, 1991

[54] PHOTOELECTROCHEMICAL REDUCTION OF CARBON OXIDES

[75] Inventors: Ronald L. Cook, Aurora; Anthony F. Sammells, Naperville, both of Ill.

[73] Assignee: Gas Research Institute, Chicago, Ill.

[21] Appl. No.: 413,639

[22] Filed: Sep. 28, 1989

[51] Int. Cl.$^5$ .............................................. C25B 3/04
[52] U.S. Cl. ................... 204/72; 204/73 R; 204/75; 204/76; 204/157.15; 429/111
[58] Field of Search ................ 204/72, 73 R, 75–76, 204/157.15; 429/111

[56] References Cited

U.S. PATENT DOCUMENTS 4,264,421  4/1981  Bard et al. ................. 204/157.51
4,484,992  11/1984  Bühler et al. ............... 204/157.52

OTHER PUBLICATIONS

R. L. Cook et al., J. Electrochem. Soc., vol. 135, pp. 3069–3070 (1988).
K. Tennakone, Solar Energy Materials, vol. 10, pp. 235–238 (1984).
S. Ikeda et al., J. Electronal. Chem., vol. 260, pp. 335–345 (1989).
Y. Hori, K. Kikuchi and S. Suzuki, "Production of CO and $CH_4$ in Electrochemical Reduction of $CO_2$ at Metal Electrodes in Aqueous Hydrogencarbonate Solution", Chem. Lett., 1695 (1985).
Y. Hori, K. Kikuchi, A. Murata and S. Suzuki, "Production of Methane and Ethylene in Electrochemical Reduction of Carbon Dioxide at Copper Electrode in Aqueous Hydrogencarbonate Solution", Chem. Lett., 897 (1986).
Y. Hori, A. Murata, R. Takahashi and S. Suzuki, "Enhanced Formation of Ethylene and Alcohols at Ambient Temperature and Pressure Electrochemical Reduction of Carbon Dioxide at a Copper Electrode", J. Chem. Soc., Chem. Commun., 17, (1988).
Y. Hori, A. Murata, R. Takahashi and S. Suzuki, "Electroreduction of CO to $CH_4$ and $C_2H_4$ at a Copper Electrode in Aqueous Solutions at Ambient Temperature and Pressure", J. Am. Chem. Soc., 109, 5022 (1987).
Y. Hori, A. Murata, R. Takahashi and S. Suzuki, "Electrochemical Reduction of Carbon Monoxide to Hydrocarbons at Various Metal Electrodes in Aqueous Solution", Chem. Lett., 1665 (1987).
R. L. Cook, R. C. MacDuff and A. F. Sammells, "Electrochemical Reduction of Carbon Dioxide to Methane at High Current Densities", J. Electrochem. Soc., 134, 1873 (1987).
R. L. Cook, R. C. MacDuff and A. F. Sammells, "Efficient High Rate Carbon Dioxide Reduction to Methane and Ethylene at in situ Electrodeposited Copper Electrode", J. Electrochem. Soc., 134, 2375 (1987).
M. Ulman, B. Aurian-Blajeni and M. Halmann, "Photoassisted Carbon Dioxide Reduction to Organic Compounds Using Rare Earth Doped Barium Titanate and Lithium Niobate as Photoactive Agents", Israel J. Chem., 22, 177 (1982).
M. Halmann, M. Ulman and B. Aurian-Blajeni, "Photochemical Solar Collector for the Photoassisted Reduction of Aqueous Carbon Dioxide", Solar Energy, 31, 429 (1983).
B. Aurian-Blajeni, M. Halmann and J. Manassen, "Photoreduction of Carbon Dioxide and Water into Formaldehyde and Methanol on Semiconductor Materials", Solar Energy, 25, 165 (1980).
A. H. A. Tinnemans, T. P. M. Koster, D. H. M. W. Thewissen and A. Mackor, "Photochemical, Photo- (List continued on next page.)

Primary Examiner—Aaron Weisstuch
Attorney, Agent, or Firm—Thomas W. Speckman; Douglas H. Pauley

[57] ABSTRACT

A process for photoelectrochemical reduction of $CO_2$ and/or CO to gaseous hydrocarbons, predominately methane, in a liquid aqueous containing electrolyte dispersion of semiconductors in the presence of copper which may be deposited on the semiconductor surface or dispersed in the electrolyte and transiently in contact with the semiconductor surface.

15 Claims, 1 Drawing Sheet

OTHER PUBLICATIONS electrochemical and Photobiological Processes", D. O. Hall and W. Pala and D. Pirrwitz, Eds., D. Reidel Publishing Co., Dordrecht, 86 (1982).

D. H. M. W. Thewissen, A. H. A. Tinnemans, M. Eeuwhorst-Reinten, K. Timmer, and A. Mackor, "Photoelectrocatalytic Reactions over Aqueous Suspensions of Silicon Carbide Powders", *Noveau J. de Chim.*, 7, 73, (1983).

Ruben Maidan, and Itamar Willner, "Photoreduction of $CO_2$ to $CH_4$ in Aqueous Solutions Using Visible Light", *J. Am. Chem. Soc.*, 108, 8100 (1986).

I. Willner, R. Maidan, D. Mandler, H. Durr, G. Dorr and K. Zengerle, "Photosensitized Reduction of $CO_2$ to $CH_4$ and $H_2$ Evolution in the Presence of Ruthenium and Osmium Colloids: Strategies to Design Selectivity of Products Distribution", *J. Am. Chem. Soc.*, 109, 6080 (1987).

PHOTOELECTROCHEMICAL REDUCTION OF CARBON OXIDES

BACKGROUND OF THE INVENTION

1. Field of the Invention

This invention relates to a process for photoelectrochemical reduction of $CO_2$ to hydrocarbons, predominately $CH_4$, $C_2H_4$ and $C_2H_6$, in a liquid aqueous containing electrolyte dispersion of semiconductors in the presence of copper. Copper may be deposited on the semiconductor surface or dispersed in the electrolyte and transiently in contact with the semiconductor surface. The presence of copper in the photoelectrochemical reduction of carbon dioxide and/or carbon monoxide considerably increases the rate of such reduction.

2. Description of the Prior Art

Electrochemical carbon dioxide reduction using copper electrodes has been shown in a number of publications. Copper, 99.99 percent pure, was used as a cathode with 0.5M $KHCO_3$ electrolyte for the electrochemical reduction of $CO_2$ at ambient temperature and current density of 5.0 mA/cm$^2$ for 30 to 60 minutes with Faradaic efficiencies for $CH_4$ of 37 to 40 percent, Y. Hori, K. Kikuchi and S. Suzuki, "Production of CO and $CH_4$ in Electrochemical Reduction of $CO_2$ at Metal Electrodes in Aqueous Hydrogencarbonate Solution," *Chem. Lett.*, 1695 (1985). In later work high purity copper cathodes, 99.999 percent, were used for the electrochemical reduction of $CO_2$ in 0.5M $KHCO_3$ electrolyte in a cell operated at a current of 5 mA/cm$^2$ for 30 minutes at temperatures of 0° C. and 40° C. shows Faradaic efficiency for production of $CH_4$ drops from 60 percent at 0° to 5 percent at 40°; $C_2H_4$ increases from 3 percent at 0° to 18 percent at 40°; while hydrogen production increases from 20 percent at 0° to 45 percent at 40°. It is stated that 99.99 percent pure copper cut the Faradaic efficiencies to about one-third of those obtained with 99.999 percent pure copper. Y. Hori, K. Kikuchi, A. Murata and S. Suzuki, "Production of Methane and Ethylene in Electrochemical Reduction of Carbon Dioxide at Copper Electrode in Aqueous Hydrogencarbonate Solution," *Chem. Lett.*, 897 (1986). Later work of electrochemical reduction of $CO_2$ at a 99.999 percent pure copper cathode in aqueous electrolytes of KCl, $KClO_4$, and $K_2SO_4$ at 19° C. and current density of 5 mA/cm$^{-2}$ showed Faradaic yields of $C_2H_4$ of as high as in the order of 48 percent, $CH_4$ 12 percent and EtOH 21 percent. Y. Hori, A. Murata, R. Takahashi and S. Suzuki, "Enhanced Formation of Ethylene and Alcohols at Ambient Temperature and Pressure Electrochemical Reduction of Carbon Dioxide at a Copper Electrode," *J. Chem. Soc.*, Chem. Commun., 17, 1988.

Electroreduction of CO at a 99.999 percent pure copper cathode in an aqueous catholyte of $KHCO_3$ at ambient temperature for 30 minutes showed hydrogen to be the predominant product and at 1.0 mA/cm$^2$ $C_2H_4$ Faradaic production was 22 percent, $CH_4$ 1 percent; 2.5 mA/cm$^2$ $C_2H_4$ Faradaic production was 21 percent, $CH_4$ 16 percent and at 5.0 mA/cm$^2$ $C_2H_4$ Faradaic production was 16 percent, $CH_4$ 6 percent. Y. Hori, A. Murata, R. Takahashi and S. Suzuki, "Electroreduction of CO to $CH_4$ and $C_2H_4$ at a Copper Electrode in Aqueous Solutions at Ambient Temperature and Pressure," *J. Am. Chem. Soc.*, 109, 5022 (1987). Similar work by the same authors showed electroreduction of CO at a 99.999 percent pure copper cathode in an aqueous 0.1M $KHCO_3$ pH 9.6 catholyte at 19° C. at 2.5 mA/cm$^2$ resulted in Faradaic production $C_2H_4$ of 21.2 percent; $CH_4$ of 16.3 percent; EtOH of 10.9 percent; and 45.5 percent $H_2$. Y. Hori, A. Murata, R. Takahashi and S. Suzuki, "Electrochemical Reduction of Carbon Monoxide to Hydrocarbons at Various Metal Electrodes in Aqueous Solution," *Chem. Lett.*, 1665 (1987).

In the reduction of $CO_2$ to $CH_4$ using 99.9 percent pure cold rolled B 370 copper cathodes with a $CO_2$ saturated 0.5M $KHCO_3$ electrolyte, Faradaic efficiencies of 33 percent were achieved for $CH_4$ at current densities up to 38 mA/cm$^2$ with no $C_2H_4$ being detected. R. L. Cook, R. C. MacDuff and A. F. Sammells, "Electrochemical Reduction of Carbon Dioxide to Methane at High Current Densities," *J. Electrochem. Soc.*, 134, 1873 (1987). Nearly Faradaic yields of hydrocarbons by the electrochemical reduction of carbon dioxide are obtained by in situ copper deposition on electrochemical cell cathodes as described in U.S. patent application Ser. No. 234,387 entitled "Electrochemical Reduction of $CO_2$ to $CH_4$ and $C_2H_4$", now U.S. Pat. No. 4,897,167 and as described in Ronald L. Cook, Robert C. MacDuff and Anthony F. Sammells, "Efficient High Rate Carbon Dioxide Reduction to Methane and Ethylene at in situ Electrodeposited Copper Electrode", *J. Electrochem. Soc.*, 134, 2375 (1987).

Photoinduced carbon dioxide reduction leading to higher organic molecules has included use of specified rare earth dopants on large band gap semiconductors as described in M. Ulman, B. Aurian-Blajeni and M. Halmann, "Photoassisted Carbon Dioxide Reduction to Organic Compounds Using Rare Earth Doped Barium Titanate and Lithium Niobate as Photoactive Agents," *Israel J. Chem.*, 22, 177 (1982). Photochemical reduction of carbon dioxide using dispersed semiconductor suspensions has been reported in a number of publications: reduction of $CO_2$ to formaldehyde and methyl alcohol with alkaline earth titanates is taught by M. Halmann, M. Ulman and B. Aurian-Blajeni, "Photochemical Solar Collector for the Photoassisted Reduction of Aqueous Carbon Dioxide," *Solar Energy*, 31, 429 (1983); heterogeneous photoassisted reduction of aqueous carbon dioxide using semiconductor powders to form methanol, formaldehyde and methane with n-$SrTiO_3$ resulting in 0.1 μmole $CH_4$/hr is taught by B. Aurian-Blajeni, M. Halmann and J. Manassen, "Photoreduction of Carbon Dioxide and Water into Formaldehyde and Methanol on Semiconductor Materials," *Solar Energy*, 25, 165 (1980). Low efficiencies, 0.01 to 0.03 percent, of photoassisted reduction of $CO_2$ over aqueous suspensions of $TiO_2/SrTiO_3$ have been reported: A. H. A. Tinnemans, T. P. M. Koster, D. H. M. W. Thewissen and A. Mackor, "Photochemical, Photoelectrochemical and Photobiological Processes", D. O. Hall and W. Pala and D. Pirrwitz, Eds., D. Reidel Publishing Co., Dordrecht, 86, (1982). Formation of methane in photoreduction of aqueous carbon dioxide in the presence of SiC powders has been reported by D. H. M. W. Thewissen, A. H. A. Tinnemans, M. Eeuwhorst-Reinten, K. Timmer, and A. Mackor, "Photoelectrocatalytic Reactions over Aqueous Suspensions of Silicon Carbide Powders," *Noveau J. de Chim.*, 7, 73, (1983). Photoreduction of carbon dioxide to methane in aqueous solutions with photogenerated $Ru(bpz)_3^+$ in the presence of colloidal Ru has been described by Ruben Maidan, and Itamar Willner, "Photoreduction of $CO_2$ to $CH_4$ in Aqueous Solutions Using Visible Light", *J. Am. Chem. Soc.*, 108, 8100 (1986). Photoreduction of $CO_2$ to $CH_4$ in aqueous solutions using visible light and Ru or Os colloids as catalysts is described by Itamar Willner, Ruben Maidan, Daphna Mandler, Heinz Durr, Gisela Dorr and Klaus Zengerle in "Photosensitized Reduction of $CO_2$ to $CH_4$ and $H_2$ Evolution in the Presence of Ruthenium and Osmium Colloids: Strategies to Design Selectivity of Products Distribution", *J. Am. Chem. Soc.*, 109, 6080 (1987).

SUMMARY OF THE INVENTION

A process for photoelectrochemical reduction of at least one of $CO_2$ and CO to hydrocarbon products, principally methane, ethylene and ethane, is carried out with dispersed particulate semiconductors in a liquid aqueous containing electrolyte wherein surface portions of the semiconductors are in contact with metallic copper, the non-semiconductor contacting surface portions of the metallic copper contacting the liquid aqueous containing electrolyte. The semiconductors are illuminated at the appropriate frequency and quantity causing excitation of electrons from the valence band to the conduction band of the semiconductors providing energy passage between the semiconductors and the copper with reduction of the $CO_2$ and/or CO to gaseous hydrocarbon products taking place at the copper/aqueous containing electrolyte interface. The photoelectrochemical reduction process of this invention ma-y be carried out at ambient temperature and pressure and has resulted in by far the highest rates known to the applicants for ambient temperature photoelectrochemical $CO_2$ reduction to $CH_4$. By the terminology aqueous containing electrolyte, we mean to include both aqueous electrolytes and aqueous miscible electrolyte liquids. In one embodiment of this invention, p-type-semiconductors are used and the $CO_2$ reduction is carried out during periods of illumination using minority carriers while in another embodiment according to this invention, n-type-semiconductors are used and $CO_2$ reduction is carried out using majority carriers. Metallic copper, contacting both the aqueous containing electrolyte and the semiconductor, may be present as copper particulates which are smaller than the particulate semiconductors or the metallic copper may be deposited onto less than about 20% of the surface area of the semiconductors. The photoelectrochemical reduction of $CO_2$ to hydrocarbon products, including methane, includes contacting surface portions of copper in contact with liquid aqueous containing electrolyte with $CO_2$ and contacting other surface portions of the copper with a semiconductor dispersed in the liquid aqueous containing electrolyte, illuminating the semiconductors causing excitation of electrons and energy passage between the semiconductor and the copper, thereby driving the reduction of $CO_2$ to hydrocarbon products at the copper, aqueous containing electrolyte interface. The gaseous hydrocarbon products may be readily removed from the liquid electrolyte.

BRIEF DESCRIPTION OF THE DRAWING

The above mentioned and other features of the present invention, and the manner of obtaining them, will become apparent and the invention will be best understood by reference to the following description of preferred embodiments read in conjunction with the accompanying drawing wherein.

DESCRIPTION OF PREFERRED EMBODIMENTS

Figure 1:
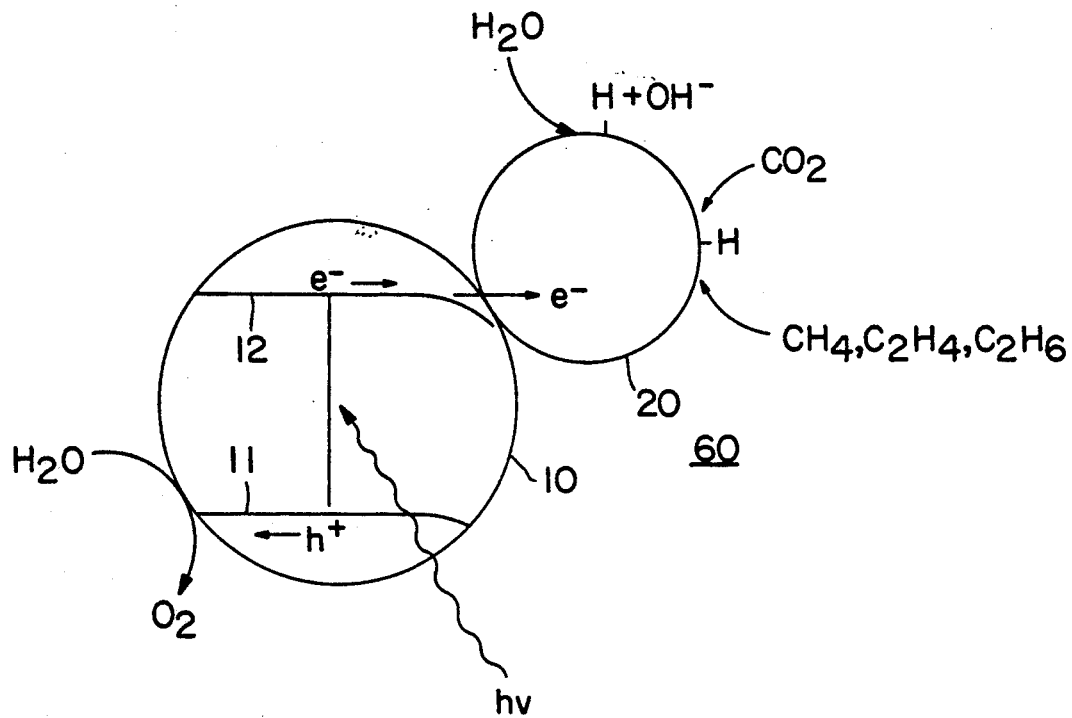
FIG. 1 is a schematic showing of a p-type-semiconductor in contact with particulate copper in an aqueous electrolyte for $CO_2$ conversion to gaseous hydrocarbon products in accordance with one embodiment of this invention.

Referring to FIG. 1 p-type-semiconductor 10 is schematically shown with valence band 11 and conduction band 12. Illuminating irradiation hr of appropriate frequency and quantity excites the electron from valence band 11 to conduction band 12. The appropriate frequency and quantity of illumination will be known to one skilled in the art depending upon the semiconductor used. Illumination of the semiconductor creates the electron hole, $h^+$, at the valence band and an electron, e, at the level of the conduction band. The electron passes to the surface of semiconductor 10. Suitable p-type-semiconductors include those which have conduction bands negative of hydrogen evolution potential, such as p-SiC, p-GaP, p-InP, and p-GaAs. The particulate semiconductors are of a suitably small size to maintain dispersed in a liquid aqueous containing electrolyte, suitably about 300 mesh to about 1000 mesh, preferably about 500 mesh to about 1000 mesh. Suitable electrolytes include aqueous salt solutions and aqueous miscible electrolytes having water mixed in organic liquids, such as, dimethylformamide, dimethylsulfoxide, methanol and propylene carbonate. Preferred electrolytes are aqueous inorganic salt solutions in which $CO_2$ is soluble and which do not provide interfering ions, such as, $KHCO_3$, $NaHCO_3$, $KCl$, $KClO_4$, $KOH$, $K_2CO_3$, $KHSO_4$, $KH_2PO_4$, and $K_2HPO_4$ in concentrations of about 0.01M to about 2M. Acidic or alkaline electrolytes may be used at pH's of about 1 to about 13, preferably at pH's of about 4 to about 6. Metallic copper particulate 20 is shown contacting the surface of semiconductor 10 with the non-semiconductor contacting surface portions of the copper particulate contacting the aqueous containing liquid electrolyte 60. The metallic copper particulates are preferably smaller than the semiconductors, preferably about ⅛ to ½ the diameter of the semiconductors. When smaller sized copper particulates are used a larger number of the copper particulates may be present without significant interference to illumination of the semiconductor. It is preferred to use copper in the form of a particulate dispension when using p-type-semiconductors to avoid reduction of dissolved copper in the electrolyte onto the surface of the semiconductor blocking illumination.

FIG. 1 schematically shows p-type-semiconductors 10 and copper particulates 20 in dispersion in an aqueous containing liquid electrolyte 60. The copper particulates and p-type-semiconductors may be transiently in contact as shown in FIG. 1. Upon illumination of the p-type-semiconductor, movement of the electron as shown causes energy passage between the semiconductor and the copper particulate. Water of the electrolyte is split at the surface of the semiconductor to provide electrons for the semiconductor and at the surface of the copper as shown to provide the reduction sites. At least one of $CO_2$ and CO dissolved in the electrolyte contacts a reduction site on the copper particulate providing photoelectrochemical reduction to hydrocarbon products as schematically shown.

Figure 2:
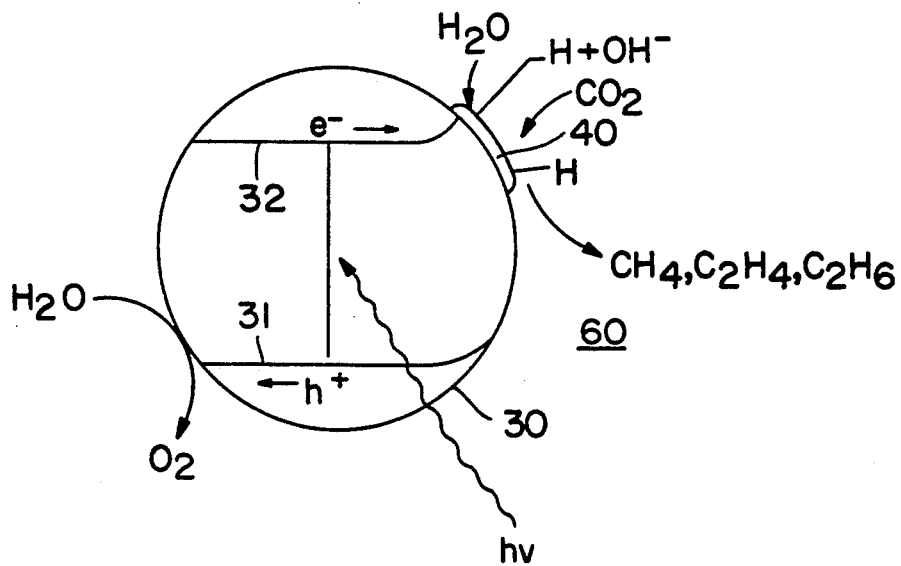
FIG. 2 is a schematic showing of an n-type-semiconductor having metallic copper plated on a portion of its surface in an aqueous electrolyte for reduction of $CO_2$ to gaseous hydrocarbons according to another embodiment of this invention.

Another preferred embodiment of this invention is schematically shown in FIG. 2 showing n-type-semiconductor 30 with valence band 31 and conduction band 32. In the case of the n-type-semiconductor, the electron transfer or energy passage between the semiconductor 30 and surface deposited copper 40 takes place via majority carriers, thereby avoiding blockage of light adsorbing sites. The same basic water splitting and $CO_2$ reduction reactions as described with respect to FIG. 1 take place at the interface of semiconductor 30 and the surface of copper coating 40 with aqueous containing electrolyte 60. Copper may be deposited onto the surface of the n-type-semiconductors by dispersing the semiconductors in potassium bicarbonate electrolyte at pH 9 with $5 \times 10^{-4}$M $CuSO_4$ followed by illumination with Cu deposition as the dark reaction. Other soluble copper salts may be used. It is preferred that less than about 20 percent of the surface of the semiconductor is covered with copper so as to not reduce illumination of the semiconductor to an extent detrimental to the process. Suitable n-type-semiconductors include n-$TiO_2$, n-$WO_3$, n-SiC, n-$SrTiO_3$, n-CdS, n-GaP and n-GaAs. The same electrolytes as described with respect to the p-type-semiconductors are suitable for use with the n-type-semiconductors.

Although described above with respect to the preferred embodiments, copper particulates and copper surface deposits on semiconductors may be used with either p- or n-type-semiconductors according to this invention.

One advantage of this invention is that it may be carried out at about ambient temperature and pressure while maintaining a high rate of $CO_2$ reduction to primarily $CH_4$ product. While increasing temperature of the reaction will increase reaction kinetics, it reduces solubility of $CO_2$ in the liquid aqueous containing electrolyte. We have found temperatures of about 25° to about 40° C. most suitable operating temperatures. Near atmospheric pressure of about 0.5 to about 5.0 atmospheres is suitable for conduct of the process of this invention.

Carbon oxides, such as $CO_2$ and CO, may be passed through the electrolyte in proximity to the copper and semiconductor surfaces wherein at least a portion of the $CO_2$ and/or CO is reduced to primarily $CH_4$ and some $C_2H_4$ and $C_2H_6$ at the copper/electrolyte interface. It is preferred the electrolyte be saturated with $CO_2$ and/or CO. $CO_2$ and/or CO may be obtained from any source, such as dry ice or gas cylinders, for use in the process of this invention.

Gaseous products comprising principally $CH_4$ and lesser amounts of $C_2H_4$ and $C_2H_6$ are removed from the liquid electrolyte and may be separated or further treated as desired. At pH=5 production rates for $CH_4$, $C_2H_4$ and $C_2H_6$ of 14.9, 3.9 and 2.3 $\mu$l hour$^{-1}$ g$^{-1}$, respectively, were obtained.

The following examples are set forth to illustrate this invention using specific materials and process conditions and should not be considered to limit the invention.

EXAMPLE I

Powdered p-SiC -325 mesh semi-conducting material obtained from Cerac, Inc. was pretreated by boiling in 6M KOH to remove surface impurities such as $SiO_2$, Si or C followed by thorough rinsing with distilled water. The pretreated p-SiC powder surface area was 0.24 m$^2$/g (measured by a Micromeretic Krypton Surface Analyzer using the Kr BET method). 100 mg of the pretreated p-SiC powder was dispersed in 10 ml aqueous 0.5M $KHCO_3$ solution. The semiconductor containing solution was placed in a Corning Glass 7740 reaction vessel having a total volume of 35 ml and U.V. cutoff at 275 nm. $CO_2$ was passed through both hydrocarbon (Chemical Research Services, Inc.) and oxygen (Oxy-Trap, Alltech Assoc.) traps prior to sparging into the continuously stirred semiconductor suspension in aqueous 0.5M $KHCO_3$. $CO_2$ was continually sparged through the solution at 20 mlmin$^{-1}$. Illumination of the reaction vessel was performed using an UltraViolet Products B-100A mercury UV lamp giving an illumination flux of 7 mW/cm$^2$ at 365 nm on the reaction vessel surface (measured by a model 8-48 Eppley radiometer). Gaseous reaction products were sampled by use of a gas-tight syringe and septum port in the exit gas stream. Hydrocarbon products were analyzed using a GOW-MAC 69-750 gas chromatograph with an FID detector. A 6 ft. stainless steel column with 80/100 mesh carbosphere packing (Alltech Assoc.) was used to separate hydrocarbon products.

No hydrocarbon reaction products were detected from illuminated p-SiC suspensions in $CO_2$ saturated $KHCO_3$ solutions at pH 9.

Upon introduction of $5 \times 10^{-4}$M $CuSO_4$ an initial $CH_4$ generation rate of 0.5 $\mu$l hr$^{-1}$ g$^{-1}$ was observed which corresponded to a rate of 2.08 $\mu$l m$^{-2}$ hr$^{-1}$ based upon p-SiC surface area. After about 2 hours $CH_4$ generation fell to undetectable levels. Oxygen evolution was also observed as a photoelectrochemical reaction product at levels about 2-3 times lower than for hydrocarbons. Photoelectrochemical reaction decrease with time may be attributed to surface oxide growth, copper deposition at photoactive sites on the p-SiC or a combination of these features.

EXAMPLE II

Using the same reactor, illumination and analyses methods as described in Example I, equimolar amounts of pretreated p-SiC powder (100 mg) and copper powder (−100 mesh Alpha, 0.02 m$^2$/g, 160 mg) were separately dispersed into $CO_2$ saturated 10 ml aqueous 0.5M $KHCO_3$ solutions. No gaseous hydrocarbons were observed to be produced either in the dark or upon illumination of either p-SiC or Cu separately in the $KHCO_3$ solutions.

In the same manner, the equimolar amounts of pretreated p-SiC powder and Cu powder were mixed together and dispersed into a $CO_2$ saturated $KHCO_3$ solution. No gaseous hydrocarbons were observed in the dark. Upon illumination, $CH_4$ was continuously observed as a reaction product.

EXAMPLE III

Mixtures of p-SiC powder and Cu powder in $CO_2$ saturated $KHCO_3$ solution as described in Example II were tested under illumination as described in Example I for hydrocarbon production rates at various solution pH's at 40° C. Results are shown in Table 1:

TABLE 1

| | Hydrocarbon Formation Rates $\mu$l m$^{-2}$ hr$^{-1}$ | | |
|---|---|---|---|
| pH | $CH_4$ | $C_2H_4$ | $C_2H_6$ |
| 3 | 16.6 | — | — |
| 5 | 62 | 16.25 | 9.5 |
| 6 | 35.4 | t | t |

TABLE 1-continued

| | Hydrocarbon Formation Rates $\mu l\,m^{-2}\,hr^{-1}$ | | |
|---|---|---|---|
| pH | CH$_4$ | C$_2$H$_4$ | C$_2$H$_6$ |
| 7 | 29.5 | t | t |
| 9 | 9.1 | — | — | t = trace

At pH 5 the above rates could be sustained over a period of 1–2 hours after which slow decrease in hydrocarbon production was observed.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

We claim:

1. A process for photoelectrochemical reduction of at least one of CO$_2$ and CO to hydrocarbon products, said process comprising: dispersing particulate semiconductors in a liquid aqueous containing electrolyte; illuminating said semiconductors at appropriate frequency and quantity causing excitation of electrons from the valence band to the conductance band of said semiconductors; contacting surface portions of said semiconductors with metallic copper, non-semiconductor contacting surface portions of said copper contacting said liquid aqueous containing electrolyte; contacting said surface portions of said copper contacting said liquid aqueous containing electrolyte with at least one of said CO$_2$ and CO causing its reduction to said hydrocarbon products by energy passage between said semiconductor and said copper.

2. A process for photoelectrochemical reduction of at least one of CO$_2$ and CO to hydrocarbon products according to claim 1 wherein said process is carried out at about ambient temperature.

3. A process for photoelectrochemical reduction of at least one of CO$_2$ and CO to hydrocarbon products according to claim 1 wherein said process is carried out at about ambient pressure.

4. A process for photoelectrochemical reduction of at least one of CO$_2$ and CO to hydrocarbon products according to claim 1 wherein said process is carried out in an aqueous electrolyte.

5. A process for photoelectrochemical reduction of at least one of CO$_2$ and CO to hydrocarbon products according to claim 1 wherein said process is carried out in an aqueous miscible electrolyte.

6. A process for photoelectrochemical reduction of at least one of CO$_2$ and CO to hydrocarbon products according to claim 1 wherein said metallic copper is in the form of copper particulates dispersed in said electrolyte, said copper particulates being smaller than said particulate semiconductors.

7. A process for photoelectrochemical reduction of at least one of CO$_2$ and CO to hydrocarbon products according to claim 1 wherein said metallic copper is deposited onto a portion of the surface of said semiconductors.

8. A process for photoelectrochemical reduction of at least one of CO$_2$ and CO to hydrocarbon products according to claim 7 wherein said metallic copper is deposited onto less than about 20 percent of the surface area of said semiconductors.

9. A process for photoelectrochemical reduction of at least one of CO$_2$ and CO to hydrocarbon products according to claim 1 wherein said semiconductors are p-type-semiconductors and said reduction is carried out during periods of illumination using minority carriers.

10. A process for photoelectrochemical reduction of at least one of CO$_2$ and CO to hydrocarbon products according to claim 9 wherein said metallic copper is in the form of copper particulates dispersed in said electrolyte, said copper particulates being smaller than said particulate semiconductors.

11. A process for photoelectrochemical reduction of at least one of CO$_2$ and CO to hydrocarbon products according to claim 10 wherein said process is carried out in an aqueous electrolyte.

12. A process for photoelectrochemical reduction of at least one of CO$_2$ and CO to hydrocarbon products according to claim 11 wherein said p-type-semiconductor is p-SiC.

13. A process for photoelectrochemical reduction of at least one of CO$_2$ and CO to hydrocarbon products according to claim 1 wherein said semiconductors are n-type-semiconductors and said reduction is carried out using majority carriers.

14. A process for photoelectrochemical reduction of at least one of CO$_2$ and CO to hydrocarbon products according to claim 13 wherein said metallic copper is deposited onto a portion of the surface of said semiconductors.

15. A process for photoelectrochemical reduction of at least one of CO$_2$ and CO to hydrocarbon products according to claim 14 wherein said process is carried out in an aqueous electrolyte.

* * * * *